United States Patent
Dognin et al.

(10) Patent No.: US 9,483,728 B2
(45) Date of Patent: Nov. 1, 2016

(54) SYSTEMS AND METHODS FOR COMBINING STOCHASTIC AVERAGE GRADIENT AND HESSIAN-FREE OPTIMIZATION FOR SEQUENCE TRAINING OF DEEP NEURAL NETWORKS

(71) Applicant: International Business Machines Corporation, Armonk, NY (US)

(72) Inventors: Pierre Dognin, White Plains, NY (US); Vaibhava Goel, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 14/528,638

(22) Filed: Oct. 30, 2014

(65) Prior Publication Data

US 2015/0161988 A1 Jun. 11, 2015

Related U.S. Application Data

(60) Provisional application No. 61/912,638, filed on Dec. 6, 2013.

(51) Int. Cl.
| | | |
|---|---|---|
| G10L 15/16 | (2006.01) | |
| G06N 3/08 | (2006.01) | |
| G10L 15/06 | (2013.01) | |
| G06N 3/04 | (2006.01) | |

(52) U.S. Cl.
CPC ............ *G06N 3/08* (2013.01); *G06N 3/0454* (2013.01); *G06N 3/084* (2013.01); *G10L 15/063* (2013.01); *G10L 15/16* (2013.01)

(58) Field of Classification Search
CPC ...... G10L 25/30; G10L 15/063; G10L 15/16
USPC ........................................................ 704/232
See application file for complete search history.

(56) References Cited

U.S. PATENT DOCUMENTS

| | | | | |
|---|---|---|---|---|
| 8,527,276 B1* | 9/2013 | Senior | ............... | G06N 3/084 704/258 |
| 8,768,870 B1* | 7/2014 | Corrado | ............... | G06N 99/005 706/12 |
| 9,177,550 B2* | 11/2015 | Yu | ............... | G06N 3/0481 |
| 9,240,184 B1* | 1/2016 | Lin | ............... | G10L 15/22 |
| 2014/0257805 A1* | 9/2014 | Huang | ............... | G10L 15/063 704/232 |
| 2015/0032449 A1* | 1/2015 | Sainath | ............... | G10L 15/16 704/235 |

OTHER PUBLICATIONS

D. Povey et al., "Minimum Phone Error and I-Smoothing for Improved Discriminative Training," IEEE International Conference on Acoustics, Speech, and Signal Processing (ICASSP), May 2002, pp. 105-108, vol. 1.

H. Su et al., "Error Back Propagation for Sequence Training of Context-Dependent Deep Networks for Conversational Speech Transcription," IEEE International Conference on Acoustics, Speech and Signal Processing (ICASSP), May 2013, pp. 6664-6668, Vancouver, British Columbia, Canada.

(Continued)

*Primary Examiner* — Jakieda Jackson
(74) *Attorney, Agent, or Firm* — William Stock; Ryan, Mason & Lewis, LLP (57) ABSTRACT

A method for training a deep neural network (DNN), comprises receiving and formatting speech data for the training, performing Hessian-free sequence training (HFST) on a first subset of a plurality of subsets of the speech data, and iteratively performing the HFST on successive subsets of the plurality of subsets of the speech data, wherein iteratively performing the HFST comprises reusing information from at least one previous iteration.

7 Claims, 4 Drawing Sheets

(56) References Cited

OTHER PUBLICATIONS

N. Le Roux et al., "A Stochastic Gradient Method with an Exponential Convergence Rate for Finite Training Sets," Advances in Neural Information Processing Systems (NIPS), Dec. 2012, pp. 2672-2680, vol. 25.

James Martens, "Deep Learning via Hessian-Free Optimization," Proceedings of the 27th International Conference on Machine Learning (ICML), Jun. 2010, pp. 735-742, vol. 10, Haifa, Israel.

Ryan Kiros, "Training Neural Networks with Stochastic Hessian-Free Optimization," International Conference on Learning Representations (ICLR), May 2013, 11 pages.

L. Bottou et al., "Large Scale Online Learning," Advances in Neural Information Processing Systems (NIPS), Dec. 2003, pp. 217-224, vol. 16, Vancouver and Whistler, British Columbia, Canada.

B. Kingsbury, "Lattice-Based Optimization of Sequence Classification Criteria for Neural-Network Acoustic Modeling," IEEE International Conference on Acoustics, Speech and Signal Processing (ICASSP), Apr. 2009, pp. 3761-3764, Taipei, Taiwan.

J. Keshet, "Direct Error Rate Minimization of Hidden Markov Models," 12th Annual Conference of the International Speech Communication Association (INTERSPEECH), Aug. 2011, pp. 449-452.

Wikipedia, "Gradient," http://en.wikipedia.org/wiki/Gradient, Oct. 2014, 14 pages.

Wikipedia, "Phoneme," http://en.wikipedia.org/wiki/Phoneme, Oct. 2014, 19 pages.

Abhishevek Shivkumar, "What's the Difference Between Gradient Descent," http://www.quora.com/Whats-the-difference-between-gradient-descent-and-stochastic-gradient-descent, Oct. 2014, 4 pages.

Wikipedia, "Stochastic Gradient Descent," http://en.wikipedia.org/wiki/Stochastic_gradient_descent, Sep. 2014, 9 pages.

\* cited by examiner

SYSTEMS AND METHODS FOR COMBINING STOCHASTIC AVERAGE GRADIENT AND HESSIAN-FREE OPTIMIZATION FOR SEQUENCE TRAINING OF DEEP NEURAL NETWORKS

CROSS-REFERENCE TO RELATED APPLICATION

This application claims the benefit of U.S. Provisional Patent Application Ser. No. 61/912,638, filed on Dec. 6, 2013, the contents of which are herein incorporated by reference in their entirety.

TECHNICAL FIELD

The field generally relates to systems and methods for training a deep neural network and, in particular, systems and methods for training a deep neural network, which combine stochastic average gradient and Hessian-free optimization.

BACKGROUND

Deep neural networks (DNNs) are gaining acceptance in automatic speech recognition (ASR) by allowing performance improvements previously unseen in state-of-the-art systems. However, new challenges arise from using DNNs in ASR. Finding the best procedure to train DNNs is an active area of research that is rendered more challenging by the availability of ever more training data.

A component of the DNN training procedure is sequence training (ST), where the network parameters are optimized under a sequence classification criterion such as Minimum Phone Error (MPE). MPE training of DNNs is an effective technique for reducing word error rate (WER) of ASR tasks. This training is often carried out using a Hessian-free (HF) quasi-Newton approach, although other methods such as stochastic gradient descent (SGD) have also been successfully applied to training. HF sequence training (HFST) uses a cross-entropy (CE) trained DNN as starting point, and is run until convergence, which is usually a computationally costly proposition.

SUMMARY OF THE INVENTION

In general, exemplary embodiments of the invention include systems and methods for training a DNN and, in particular, systems and methods for training a DNN, which combine stochastic average gradient and HF optimization.

Embodiments of the present invention provide a novel stochastic HF sequence training for DNNs. This procedure, referred to herein as dynamic stochastic average gradient with Hessian-free (DSAG-HF), leverages gradient averaging as proposed in a stochastic average gradient approach, and carries out an HF conjugate gradient (CG)-based optimization using these averaged gradients. Experimentally, it was observed that DSAG-HF not only allows for faster convergence in computation time than conventional HF sequence training (about half the time required), but also allows for faster held-out loss improvements, especially in the early updates.

According to an exemplary embodiment of the present invention, a method for training a DNN, comprises receiving and formatting speech data for the training, performing HFST on a first subset of a plurality of subsets of the speech data, and iteratively performing the HFST on successive subsets of the plurality of subsets of the speech data, wherein iteratively performing the HFST comprises reusing information from at least one previous iteration.

According to an exemplary embodiment of the present invention, a system for training a DNN, comprises a memory and at least one processor coupled to the memory, an input component, executed via the at least one processor, which receives and formats speech data for the training, a training component, executed via the at least one processor, which performs HFST on a first subset of a plurality of subsets of the speech data received from the input component, and iteratively performs the HFST on successive subsets of the plurality of subsets of the speech data, wherein the training component reuses information from at least one previous iteration when iteratively performing the HFST.

According to an exemplary embodiment of the present invention, a computer program product for training a DNN, comprises a computer readable storage medium having program instructions embodied therewith, the program instructions executable by a processor to cause the processor to perform a method comprising receiving and formatting speech data for the training, performing HFST on a first subset of a plurality of subsets of the speech data, and iteratively performing the HFST on successive subsets of the plurality of subsets of the speech data, wherein iteratively performing the HFST comprises reusing information from at least one previous iteration.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for training a DNN and, in particular, systems and methods for training a DNN, which combine stochastic average gradient and HF optimization. This invention may, however, be embodied in many different forms and should not be construed as limited to the embodiments set forth herein.

Embodiments of the present invention provide a novel stochastic approach to HFST inspired by a stochastic average gradient (SAG) method that alleviates the computational burden of HFST, while allowing for better solutions, as measured by MPE losses on a held-out set. Embodiments of the present invention are not necessarily limited to application of the SAG method in connection with sequence training, and may include other types of second order HF optimization.

As used herein, "deep neural network (DNN)" can refer to an artificial neural network having multiple hidden layers of nodes between the input and output layers. Each hidden layer computes a non-linear transformation of a previous layer. Some layers comprise an affine transformation, parameterized by a weight matrix and bias vector, followed by a nonlinearity which may be either pointwise (e.g., a pointwise logistic nonlinearity or pointwise rectified linear nonlinearity) or vector-valued (e.g., a softmax nonlinearity). Other layers may implement fixed operations such as contrast normalization or summarization and downsampling of inputs (called "pooling" in the neural network literature).

As used herein, "second order optimization" can refer to a class of optimization techniques for which the asymptotic rate of residual convergence is quadratic (i.e., of second order). A Newton optimization method is an example of second order optimization. Second order methods typically converge much faster to a local minimum than their superlinear, and linear (first order) counterparts. A first order optimization method may include, for example, steepest descent; a super linear method may include, for example, a quasi-Newton method.

As used herein, "sequence training (ST)" can refer to analyzing voice inputs and using the voice inputs to fine-tune the recognition of speech by using information from time-sequential lattices corresponding to utterances. Sequence training is performed using utterance randomization.

As used herein, "cross-entropy (CE) training" can refer to a process in which the parameters of a deep neural network are adjusted to minimize the cross-entropy between a reference labeling of a training data set and the output of the neural network.

As used herein, "Hessian" or "Hessian matrix" is a matrix of second-order partial derivatives of a function, which is used in non-linear optimization problems.

As used herein, "Hessian-Free (HF) training" can refer to a second order method of optimization that does not require explicit formation of the Hessian (and, therefore, called "Hessian-Free"). The underlying idea is to compute the action of the Hessian upon a vector rather than the Hessian itself. HF methods enable the incorporation of curvature information, while avoiding the computationally intensive explicit construction of the Hessian or its inverse.

As used herein, "conjugate gradient (CG)" can refer to an iterative algorithm used to find a solution direction given a linear system. CG is typically not run to convergence, but to some pre-determined point of relative solution improvement, and is often limited to a maximum number of iterations.

As used herein, "stochastic gradient descent (SGD)" can refer to a gradient descent optimization method for minimizing an objective function, such as an error function, which updates a set of parameters in an iterative manner. With SGD, less than all of the samples in a training set, for example, one or more of the samples randomly selected, are used to perform an update for a parameter in a particular iteration.

As used herein, "phone error" or "phone error rate (PER)" can refer to the error rate in phoneme recognition. A phoneme is a basic unit of a language's phonology, which is combined with other phonemes to form meaningful units such as words. A phoneme can refer to the smallest contrastive linguistic unit which may bring about a change of meaning. For example, a difference in meaning between the English words kill and kiss is a result of the exchange of the phoneme /l/ for the phoneme /s/.

As used herein, a "loss function" can refer to a function, for example, $L(x,w)$, which is a measure of the cost of using parameters w as a solution to a problem that is being attempted to solve, given observed data x. A loss function, for example, $L(x,w)$, is defined, and attempts are made to find parameters (w) that minimize the loss (e.g., minimize the cost of using w as a solution) given the observed data x. In the case of many data points $x_i$, the global loss is $Loss(w)=1/N * \Sigma_i L(x_i, w)$ ⊠i∈{0, 1, ..., N-1} (where N is the number of different individual data points $x_i$). $Loss(w)$ is the mean of the individual losses, and depends only on w, the parameters to be solved for.

As used herein, "Gradient of Loss" refers to the generalization of the first derivative of Loss( ). Since the $Loss(w)$ is a function, it is possible to take its derivatives. Since the parameters (w) are multidimensional, the gradient of $L(w)$ is taken with respect to the parameters (w). Gradient is a multivariate generalization of a derivative. For example, the gradient may point in the direction of the greatest rate of increase of a function and its magnitude is the slope of the graph in that direction.

As used herein, "held-out set" can refer to a set of data on which model performance is evaluated. In statistical modeling, a model is trained on the training set and the model performance is evaluated on the held-out set to ensure that the found solution is general enough, and more is being accomplished than just learning the training data. The training and held-out sets do not overlap. The term "held-out" comes from the feature that the held-out set is composed of data "held" away from the training data. For example, a data set can be split into 2 distinct parts, "training" and "held-out."

As used herein, "held-out loss" can refer to the loss $L(x,w)$ for all data x coming from the held-out set.

As used herein, "Minimum Phone Error (MPE)" can refer to a smoothed approximation to the phone error rate. MPE is a type of loss function used in connection with the embodiments of the present invention.

As used herein, "MPE Loss on held-out set" can refer to, in connection with the MPE loss function, a measure of how good or bad a model is in connection with the data from the held-out set.

As used herein, "Levenberg-Marquardt damping" can refer to a method used to solve non-linear least squares problems, for example, minimization problems that arise in least squares curve fitting.

Second-Order Hessian-Free Optimization

Learning for a DNN is a difficult task due to the issue of vanishing gradients, pathological objective function curves and non-convex objective functions. Second-order methods can alleviate some of the burden from the first two challenges by leveraging curvature information of the loss function.

Considering a DNN with parameters θ (weights and biases), the loss function Lθ can be approximated around θ such that $$L(\theta+\delta) \approx L(\theta) + \nabla L(\theta)^T \delta + \frac{1}{2} \delta^T B(\theta) \delta, \quad (1)$$

where the right-hand side is a quadratic approximation of $L(\theta+\delta)$, and $\nabla L(\theta)$ is the gradient of the loss function at θ. If B(θ) is equal to the Hessian H(θ) (or an approximation of it), and $B(\theta)$ is positive-semidefinite, then $L\theta$ is locally convex and a minimum can be found. A direct optimization of equation (1) would give the minimizer $$\delta = -B^{-1}(\theta)\nabla L(\theta), \quad (2)$$

which is a solution to the system $$B(\theta)\delta = -\nabla L(\theta). \quad (3)$$

Minimizing equation (1) with respect to $\delta$ is equivalent to solving the system in equation (3) for $\delta$. Consequently, minimizing the loss $L(\theta)$ can be done iteratively, $$\theta_{k+1} = \theta_k + \alpha_k \delta_k, \quad (4)$$

where $\alpha_k \delta_k$ is a step taken in the Newton's direction $\delta_k, \alpha_k \in [0,1]$. The equivalent of equation (3) with iterative solutions, an equation that is used below becomes $$B(\theta_k)\delta_k = -\nabla L(\theta_k). \quad (5)$$

Since DNNs have a large number of parameters, direct computation of the Hessian is impractical, but not necessary when using the conjugate gradient (CG) method. CG is an iterative algorithm used to find a solution direction $\delta$ given a linear system like the one in equation (3). As noted above, CG is typically not run to convergence but to some pre-determined point of relative solution improvement, and is often limited to a maximum number of iterations.

A property of CG is that the Hessian is only needed in the context of curvature-vector product $B(\theta)\delta$ as seen in equation (3). It is therefore possible to define a Hessian-free optimization of equation (1) when using CG to find an approximate solution $\delta$. In practice, the Hessian of the loss function $L(\theta)$ is not positive-definite for DNNs, and a Gauss-Newton matrix $G(\theta)$ is used instead. However $G(\theta)$ is positive-semidefinite, and needs to be regularized by using $G(\theta)\lambda I$. $\lambda$ is a damping factor which is adjusted heuristically.

Stochastic Hessian-Free Optimization

The second-order HF optimization can be transformed into a stochastic Hessian-free (S-HF) optimization. The Hessian-free optimization procedure can include four steps run in sequence at each pass k over all the training data.

First, the gradient $\nabla L(\theta_k)$ is computed on all the training data. Second, CG is used to find iterative solutions $\delta_k$ to equation (5). CG requires an initial search direction $\delta_k^0$, which is commonly set to 0. However, faster convergence is attained when $\delta_k^0$ is chosen to be $\sigma\delta_{k-1}$, a scaled version ($\sigma=0.95$) of the previous final search direction from CG. This acceleration technique is called $\delta$-momentum. Furthermore, CG is usually truncated to a maximum of 250 iterations to balance the overall CG cost. Third, a "backtrace" over all CG iterates is done to find a potentially better candidate that minimizes the loss on a held-out set $L^h(\ )$. Finally, once a valid search direction $\delta_k$ is found, a linear search is done to find the best $\alpha_k$ given the chosen direction, as seen in equation (4).

Curvature-products dominate the computational cost of CG after few passes over the data, and can become prohibitive when compared to the fixed cost for the gradient. Therefore, a 1% sample of the training data can be used for curvature-products, balancing cost and accuracy of CG.

In accordance with an embodiment of the present invention, a stochastic approach to this Hessian-free procedure can be defined. Like for stochastic gradient methods, it may not be necessary to process all the training data to update the model. In accordance with an embodiment of the present invention, the HF training to define a Hessian-free optimization of equation (1) when using CG to find an approximate solution $\delta$ is not inherently run on all the training data, especially in connection with the first few model updates. Therefore, a stochastic HF procedure (S-HF) is defined that would take a random subsample of the training set, performs one (or a few) model updates in connection with equation (4), then takes a new random sample and iterates the process until convergence. This S-HF process is explored in addition to the dynamic stochastic average gradient with Hessian-free (DSAG-HF) procedure, as described below in accordance with an embodiment of the present invention. Very short CG runs (e.g., 3-5 iterations) may require re-tuning an implementation since decisions about $\delta$-momentum, Levenberg-Marquardt damping, size of gradient and curvature mini-batches may need to be revisited.

Stochastic Average Gradient

Embodiments of the present invention adapt ideas to improve SGD to second-order Hessian-free optimization. In accordance with an embodiment of the present invention, the SAG technique is proposed as a way to improve on conventional stochastic gradient (SG) techniques. Writing the loss function as a sum of loss values over training samples, $$\underset{\theta}{\text{minimize}} \; \mathcal{L}(\theta) = \frac{1}{T}\sum_{i=1}^{T} f_i(\theta), \quad (6)$$

where T is the number of samples in the training data, and $f_i(\theta)$ the value of the loss for sample i. With stochastic gradient, parameters $\theta_k$ are updated for each random sample $i_k$ as $$\theta_{k+1} = \theta_k - \beta_k \nabla f_{i_k}(\theta_k) \quad (7)$$

where $\beta_k$ is a step size. In contrast, the stochastic average gradient method updates model parameters as $$\theta_{k+1} = \theta_k - \frac{\beta_T}{T}\sum_{i=1}^{T} \mu_k^i, \quad (8)$$

where, for each training example $i_k$ randomly selected, $$\mu_k^i = \begin{cases} \nabla f_i(\theta_k) & \text{if } i = i_k, \\ \mu_{k-1}^i & \text{otherwise.} \end{cases} \quad (9)$$

Effectively, SAG re-uses gradient information computed at previous iterations to help the convergence of its solution. By re-using gradient information from past updates, SAG consequently simulates the presence of more training data than is really observed for each model update.

Dynamic Stochastic Average Gradient with Hessian-Free Optimization

Embodiments of the present invention extend and combine the concept of SAG with HF sequence training, which is referred to as dynamic stochastic average gradient with Hessian-free (DSAG-HF) optimization. Embodiments of the present invention extend SAG by dynamically weighting the contribution of previous gradients, and by combining SAG with a stochastic HF optimization.

In accordance with an embodiment of the present invention, reusing gradient information from previous iterations is a particularly powerful property of SAG that can be directly used in second-order HF sequence training. For example, in accordance with an embodiment of the present invention, a gradient of the loss is computed on a sample portion of the training data and a solution is found. Then, on a next iteration, using another subset of the training data, a gradient of the loss is computed on that subset of the training data, and both the gradient from the first sample portion, and the gradient from the current sample portion are integrated to find the solution in the second iteration. Weighting is performed to calculate the contribution of the gradient from the first and second iterations, when finding the solution in the second iteration.

More specifically, letting the training data be split into B batches; then equation (3) can be rewritten equivalently as $$B(\theta) = -\sum_{b=1}^{B} \nabla \mathcal{L}^b(\theta), \qquad (10)$$

where $\nabla L^b(\theta)$ is the gradient of the loss computed from samples in batch b. Embodiments of the present invention use the following SAG-like system for an iterative approach:

$$B(\theta_k)\delta_k = -\sum_{b=1}^{B} \gamma_k^b \Lambda_k^b, \qquad (11)$$

where $\gamma_k^b$ is a weighting factor at iteration k of the gradient computed for training batch b, and $$\Lambda_k^b = \begin{cases} \nabla \mathcal{L}^b(\theta_k) & \text{if } b = b_k, \\ \Lambda_{k-1}^b & \text{otherwise.} \end{cases} \qquad (12)$$

starting with $\Lambda_0^b=0, \forall b$. In equation (11), each step k=0, 1, . . . corresponds to an update over training data contained in batch $b_k$. However, for batches other than $b_k$, the gradient information from previous steps is used. To find an approximate solution to equation (11), embodiments of the present invention use truncated CG as in regular HF optimization. At iteration k, the CG procedure is carried out on 1% of data from batch $b_k$.

An aspect of this approach is to properly define the weighting factors $\gamma_k^b$. These weights can make DSAG-HF behave purely like an S-HF process if no gradient from previous batches is used, to an approximation of a full training if all gradients from previous batches are used uniformly. However, using uniform weights does not yield good results, and it was found experimentally that those weights need be re-evaluated at each step k. In accordance with an embodiment of the present invention, an approach is used that keeps track of the held-out losses corresponding to each batch b as follows:

$$\mathcal{L}_k^b = \begin{cases} \mathcal{L}^b(\theta_k) & \text{if } b = b_k, \\ \mathcal{L}_{k-1}^b & \text{otherwise.} \end{cases} \qquad (13)$$

$L^h(\theta_k))$ is the loss on a held-out set. The weights $\gamma_k^b$ are chosen to be $$\gamma_k^b = \exp(\eta[L_k^{b_k} - L_k^b]) \qquad (14)$$

where $\eta$ is a tunable parameter that controls the exponentiation of the weights across batches. A relatively larger tunable parameter $\eta$ trends toward reliance on only a previous gradient, and not on a current gradient, and a relatively smaller tunable parameter $\eta$ trends toward not using a previous gradient. The weights are dynamically estimated to provide a loss function gradient before any CG iterations take place. In that sense, this is a dynamic schedule that controls the gradients' averaging weights. The resulting procedure is referred to herein as dynamic stochastic average gradient with Hessian-free (DSAG-HF) optimization.

In accordance with an embodiment of the present invention, weights are chosen based on a difference between a held-out loss of a current iteration and a held-out loss of at least one previous iteration. The assigned weight is inversely proportional to the difference, such that a relatively larger difference between a held-out loss of a current iteration and a held-out loss of a previous iteration results in a smaller weight given to the gradient corresponding to the held-out loss of the previous iteration, and a relatively smaller difference results in a larger weight given to the gradient corresponding to the held-out loss of the previous iteration. In other words, in a situation that is relatively closer to convergence, where it is appropriate to consider more previous gradient information, a weighting function is used to assign higher weights to gradients with held-out loss values closer to a held-out loss value of a current model (i.e., smaller difference). Conversely, in a situation that is relatively farther away from convergence, where it is appropriate to consider less gradient information, a weighting function assigns lower weights to gradients with held-out loss values farther from the held-out loss value of the current model (i.e., larger difference).

For the first few steps k, equation (11) is a rough approximation to equation (5), and is closer to the S-HF procedure mentioned above. For the first step k=0, a gradient computed only from data in $b_k$ is used. For further steps, gradients computed from parameters $\theta_k, \theta_{k-1}, \ldots$, that are expected to be quite different from one another, are incorporated into the final gradient term. A relatively larger difference between the model parameters $\theta_k, \theta_{k-1}$, etc. is particularly true for a model's first few updates, as the held-out loss changes significantly across these first steps. However, as the parameters converge to a solution, the difference between the model parameters $\theta_k, \theta_{k-1}$, etc. becomes smaller, and equation (11) asymptotically converges to equation (5).

Therefore, DSAG-HF is able to simulate the use of more data than is actually observed for gradient computation at each batch b since gradients computed for previously observed batches are brought in. After all B batches have been observed, the final gradient contains a contribution of virtually all of the training data, while only 1/B has been truly observed. This property enables updates to be faster than for conventional HF training, but also, not unlike for a SG process, it enables updates to be potentially quite different from conventional HF training. In experimental results set forth below, DSAG-HF used for sequence training of DNNs is compared to conventional HF and stochastic HF sequence training.

Experimental Setup

Experiments were conducted using an IBM® internal US English ASR task. The training set consists of 1500 hours of recorded audio. Training transcripts are obtained by decoding the audio using an existing large vocabulary continuous speech recognition system. Recordings that are deemed to be all silence or noise, and sentences decoded with very low confidence are excluded from the training data. The final training data amounts to 1.53M utterances for 3.7 k speakers.

The first step in the DNN training procedure is to pre-train the DNN by growing it layer-wise under CE criterion. Once the final topology is reached, a CE model is trained fully using SGD with 5 passes over all of the training data. This model (CE-5) is used as an initial guess for the DNN parameters for subsequent HFST; since HFST requires lattices on all of the training data.

The baseline model is trained using conventional HFST, where each training iteration uses 1500 hours of training data. The training is run until convergence as measured by an MPE loss on a held-out set of 15 hours of data set aside from the training data. The implementation of HFST for the baseline system is based on Brian Kingsbury, "*Lattice-based optimization of sequence classification criteria for neural-network acoustic modeling*," in ICASSP, April 2009, pp. 3761-3764, with an HF procedure similar to James Martens, "*Deep learning via Hessian free optimization*," in Proceedings of the 27th International Conference on Machine Learning (ICML-10), Haifa Israel, June 2010, pp. 735-742.

The input features are post-linear discriminant analysis (LDA) features from 48 dimensional frames composed of 12 static cepstra and their 1st, 2nd, and 3rd time derivatives. These 48-dim features are projected onto an LDA space of 32 dimensions. Then, temporal context is created by splicing 9 successive frames of 32 dimensional post-LDA features to generate 288 dimensional features. These 288-dim features are the inputs to the DNNs. The topology of the DNNs is 6 layers of 424 hidden units with sigmoid non-linearities. The output targets are 512 context-dependent states from building a context dependency tree from the training data.

All models are compared with a measure of MPE loss over the held-out set mentioned previously. Word error rates (WERs) are also measured on a dev set composed of 684 utterances. The sequence training infrastructure is identical for each of the three techniques (i.e., baseline, S-HF and DSAG-HF). All computations (gradient, curvature product, etc.) are distributed over many machines and the distributed computing topology is kept identical for all of the trainings.

Experimental Results

The DSAG-HF, and S-HF procedures were performed starting from CE-5. The training data was split in 10 batches randomly sampled without replacement from the full training data, with each batch balanced for duration. After the first 10 steps, all batches are processed and the training is ensured to have seen all the training data. Further training steps rotate among the batches, and every 10 steps, the model will have seen all 1500 hours of training data again. All of the experiments presented here use DSAG-HF parameter η=0.7.

Figure 1:
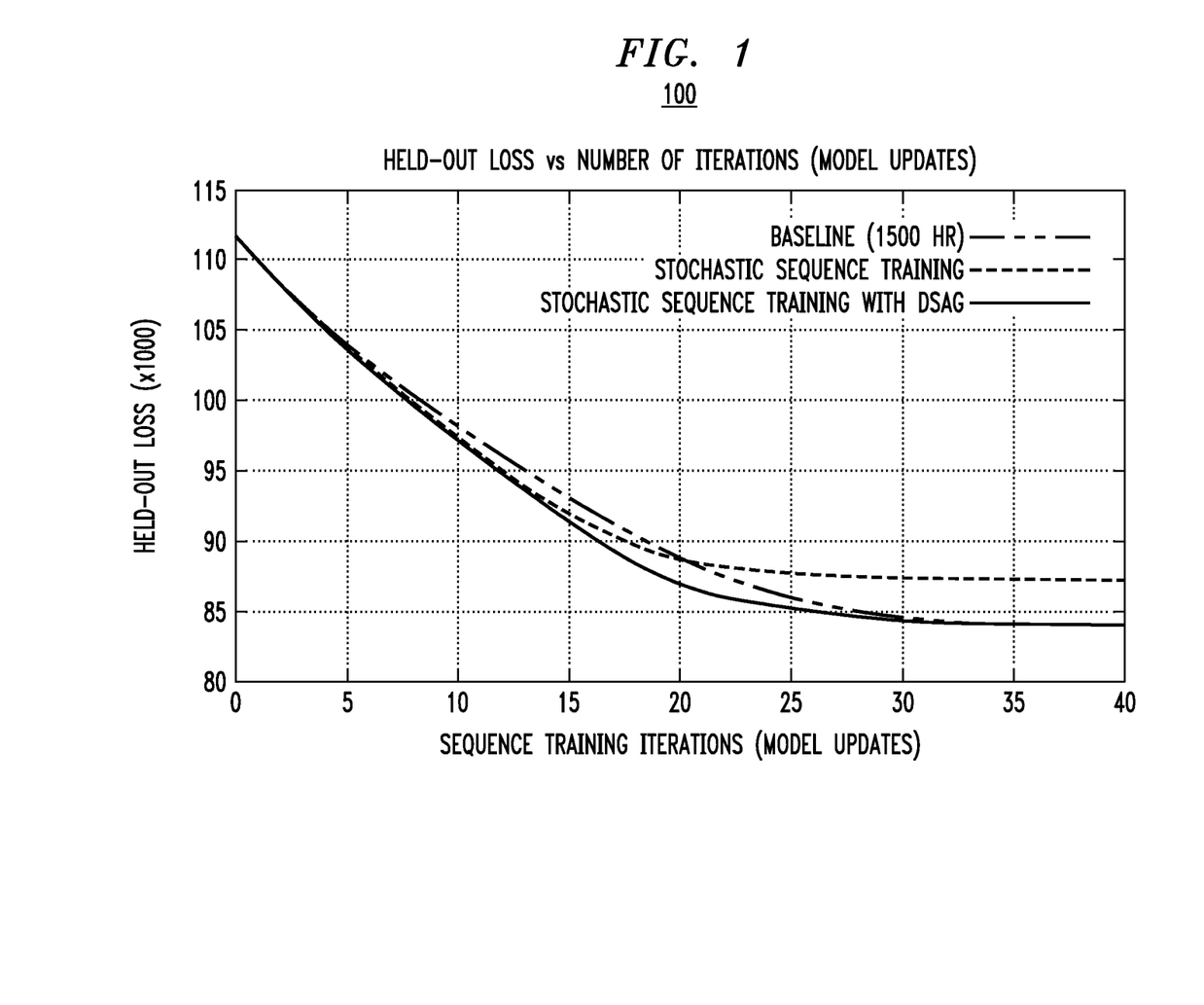
FIG. 1 is a graph illustrating held-out MPE loss as a function of a number of updates for a baseline, a stochastic-HF (S-HF), and a dynamic stochastic average gradient with Hessian-free (DSAG-HF) approach, according to an exemplary embodiment of the invention.

FIG. 1 is a graph illustrating the held-out MPE loss as a function of model updates for the three approaches (i.e., baseline, S-HF and DSAG-HF) to sequence training. The baseline approach uses 1500 hours of data per iteration, and the S-HF and DSAG-HF approaches use batches of $\frac{1}{10}^{th}$ of the training data per iteration. All held-out MPE losses are computed on a 15 hours held-out set.

Comparing S-HF to the baseline, it is noted that for the initial update iterations, the S-HF procedure results in better held-out loss than the baseline. However, S-HF saturates early and converges to a significantly worse held-out loss value. The S-HF and baseline loss curves cross at around iteration 20, never to recover. In contrast, the DSAG-HF procedure appears to consistently out-perform the baseline, and converges to a better final held-out loss, as is also seen in Table 1 below. In addition, it is noted that for both S-HF and the DSAG-HF procedures, the cost of each update is substantially less than baseline. As noted above, each stochastic update processes roughly $\frac{1}{10}^{th}$ of the training data.

Table 1 shows the held-out MPE loss at a few specific model update iterations for the three procedures depicted in FIG. 1.

TABLE 1

| Procedure (# iterations) | Loss (×1000) | CPU time (days) | WER (%) |
|---|---|---|---|
| Baseline | | | |
| 10 | 98.15 | 1.11 | 14.0 |
| 20 | 88.77 | 3.72 | 12.4 |
| 30 | 84.60 | 7.49 | 11.9 |
| 34 | 84.08 | 9.06 | 11.8 |
| Stochastic HF | | | |
| 10 | 97.38 | 0.38 | 13.9 |
| 20 | 88.64 | 1.13 | 12.5 |
| 30 | 87.34 | 1.73 | 12.2 |
| 40 | 87.20 | 2.08 | 12.2 |
| 50 | 87.17 | 2.49 | 12.1 |
| DSAG-HF | | | |
| 10 | 97.13 | 0.42 | 14.0 |
| 20 | 86.91 | 1.46 | 12.3 |
| 30 | 84.34 | 2.88 | 12.0 |
| 40 | 84.04 | 3.95 | 11.9 |
| 50 | 83.88 | 4.74 | 11.8 |

Table 1 also provides the computation time (CPU time) up to those respective iterations, as well as a WER on a deb set for baseline, S-HF and DSAG-HF approaches. Values are reported for every 10 iterations up to convergence. From this table, it is clear that DSAG-HF reaches a better held-out loss at about half the processing time than the baseline system. S-HF, despite being relatively faster than the baseline and DSAG-HF systems, converges to a much worse solution than the baseline and DSAG-HF systems. The difference of processing time between S-HF and DSAG-HF is accounted for by the difference of CG iterations required at each step. DSAG-HF requires longer CG runs than S-HF. There may be a need to revisit the Levenberg-Marquardt style heuristic for damping as a slight oscillation of the λ damping factor is noticed over the iterations.

In terms of WERs on the dev set, a common trend is observed in all of the experimental results with sequence trained DNNs. The held-out losses are positively correlated to the WERs. Baseline and DSAG-HF models both converge at around 11.8% WER while S-HF is reaching around 12.1% WER at convergence. In fact, one can notice that for the sole purpose of WER, the models need not necessarily completely converge to provide the best or an acceptable WER. Small improvements in held-out loss do not completely translate into better WER.

One note-worthy property of DSAG-HF is that no tuning is required except for the η parameter, since all scheduling of the weights is done based on the difference of held-out losses between the current and previous steps.

Experimental results for training DNNs on 1500 hours of audio data show that compared to baseline HF training, DSAG-HF leads to better held-out MPE loss after each model parameter update, and converges to an overall better loss value. Furthermore, since each update in DSAG-HF takes place over smaller amount of data, this procedure converges in about half the time as baseline HF sequence training.

Figure 2:
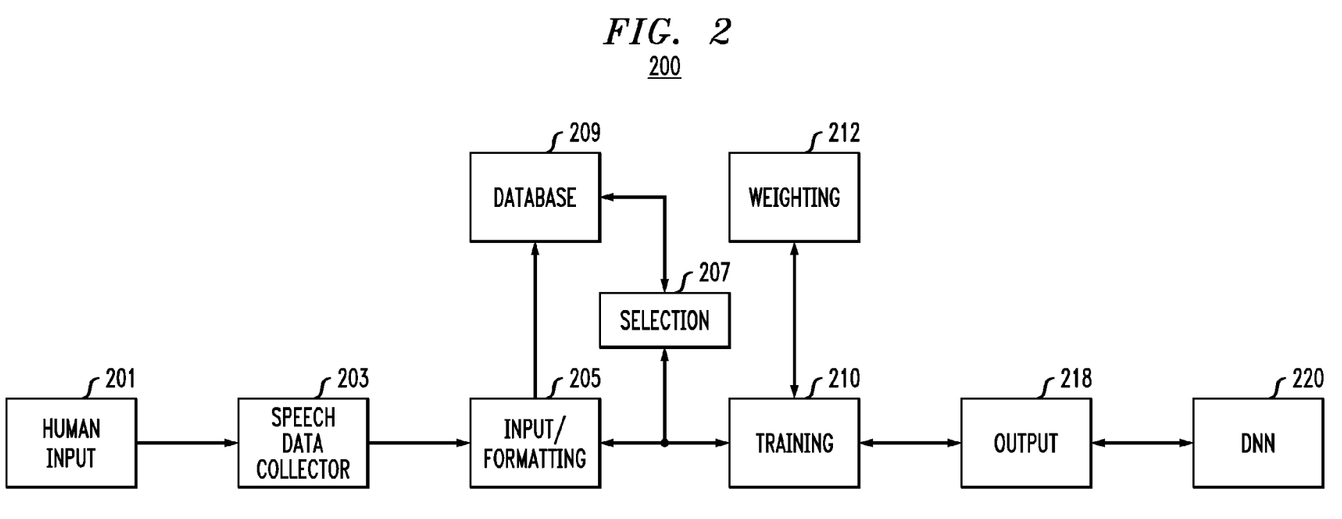
FIG. 2 is a flow diagram of a system for training a deep neural network, according to an exemplary embodiment of the invention.

FIG. 2 is a block diagram of a system for training a DNN, according to an exemplary embodiment of the present invention. As shown in FIG. 2 by lines and/or arrows, the components of the system 200 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

Referring to FIG. 2, human input 201 from, for example, the IBM® internal US English ASR task, is inputted to a speech data collector 203. The human input 201 can also come from speakers communicating over a communication system, such as, for example, over the telephone. It is to be appreciated that a telephone system might be wireless or wired. Principles of the invention are not intended to be restricted to the type of speech data source, voice channel or communication system that is employed to receive/transmit speech signals to be used for training.

The speech data is collected through the speech data collector 203, which may be a storage repository for the speech being processed by the system 200. The speech data collector 203 sends the speech data to an input/formatting component 205. In addition to the input/formatting component 205, the system 200 includes a selection component 207, a database 209, a training component 210, a weighting component 212, and an output component 218. Each of the components of the system 200 can be executed via one or more processors coupled to a memory.

The input/formatting component 205 receives the speech data from the speech data collector 203, and formats the speech data so that it is in an appropriate form for training by the training component 210. The formatted speech data can be stored in a database 209, which is accessible by selection 207 and training 210 components. The selection 207 and training 210 components can also access the formatted speech data from the input/formatting component 205 without going through the database 209.

In accordance with an embodiment of the present invention, the training component 210 performs Hessian-free sequence training on a first subset of a plurality of subsets of the speech data received from the input/formatting component 205. The training component 210 can receive the speech data directly from the input/formatting component 205, or from the database 209. In accordance with an embodiment, the selection component 207 selects the first subset and successive subsets of the training data for training by the training component 210. The training component 210 iteratively performs the Hessian-free sequence training on successive subsets of the plurality of subsets of the speech data, and reuses information from at least one previous iteration when iteratively performing the Hessian-free sequence training.

According to an embodiment, the information comprises gradient information, and the system 200 further comprises a weighting component 212 operatively coupled to the training component 210, which weights the gradient information. The weighting component 212 may choose weights based on a difference between a held-out loss of a current iteration and a held-out loss of at least one previous iteration, and change weights assigned to the gradient information for different iterations.

The weighting component 212 dynamically estimates weights assigned to the gradient information to provide a loss function gradient before an iteration takes place, and assigns weights to the gradient information based on a tunable parameter that controls exponentiation of the weights across the plurality of subsets.

According to an embodiment, the weighting component 212 uses a weighting function to assign higher weights to gradients with held-out loss values closer to a held-out loss value of a current model, and lower weights to gradients with held-out loss values farther from the held-out loss value of the current model.

In accordance with an embodiment, the training component 210 integrates the weighted gradient information with current gradient information obtained for parameters of a current iteration. The training component 210 computes a gradient of a loss for the first subset, and the weighting component 212 defines a weighting factor of the gradient, and applies the weighting factor to the gradient to result in a weighted gradient. The training component 210 then uses the weighted gradient in connection with sequence training on a successive subset of the plurality of subsets.

The training component 210 communicates with the deep neural network 220 via, for example, an output component 218, to obtain necessary network data needed for training the network 220, and to communicate results of the training to the network 220. While the network 220 is illustrated as a DNN, the embodiments of the present invention are not necessarily limited to use in connection with a DNN 220, and may be applicable to other types of networks.

In accordance with an embodiment of the present invention, a system 200 for training a DNN 220 comprises at least one processing device for executing and interacting with components, and at least one component (e.g., training component 210) for combining a stochastic approach with second order HF ST. The combination uses average gradient information from previous iterations.

In accordance with an embodiment of the present invention, a system 200 for using at least one stochastic approach to decrease a computational load required for training a DNN 220 comprises at least one processing device for executing and interacting with components, at least one selection component 207 for selecting a first subset of training data, and at least one training component 210 applying HF ST to a first subset of training data. The selection component 207 iteratively provides a successive subset of training data and the training component 210 applies HF ST to each successive subset of training data until DNN parameters converge to a stable solution.

Figure 3:
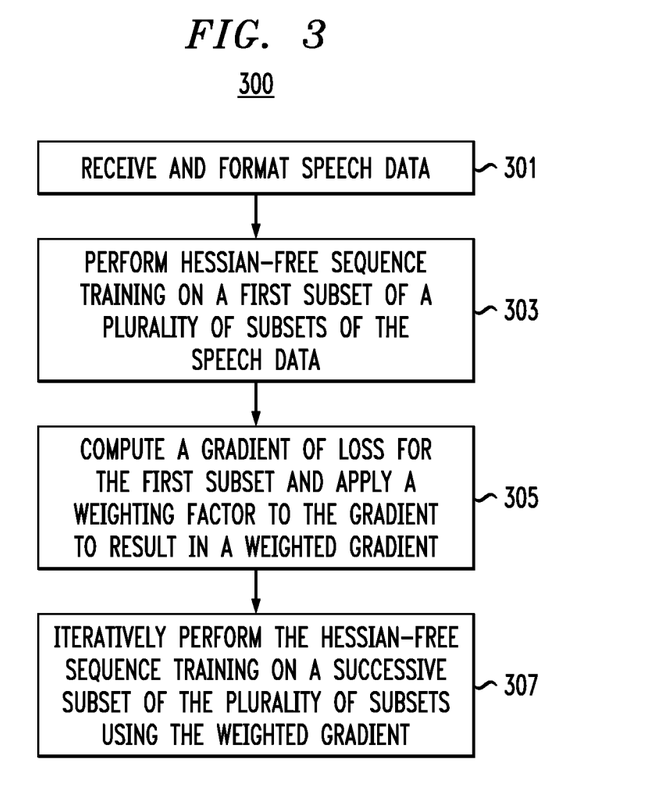
FIG. 3 is a block diagram of a process for training a deep neural network, according to an exemplary embodiment of the present invention.

FIG. 3 is a flow diagram of a process for training a DNN, according to an exemplary embodiment of the invention. Referring to FIG. 3, a method 300 for training a deep neural network, comprises receiving and formatting speech data for the training (block 301) and performing Hessian-free sequence training on a first subset of a plurality of subsets of the speech data (block 303). The method 300 further includes computing a gradient of loss for the first subset and defining and applying a weighting factor to the gradient to result in a weighted gradient (block 305). At block 307, the Hessian-free sequence training is performed on a successive subset of the plurality of subsets of the speech data by reusing information from at least one previous iteration, wherein the reusing comprises using the weighted gradient (block 307).

In accordance with an embodiment, weighting a gradient comprises choosing a weight based on a difference between a held-out loss of a current iteration and a held-out loss of at least one previous iteration. The weighted gradient is integrated with a current gradient obtained for parameters of a current iteration. Weights assigned to the gradients may be changed for different iterations.

Weighting a gradient may comprise dynamically estimating a weight assigned to the gradient to provide a loss function gradient before an iteration takes place. Weights assigned to gradients may be based on a tunable parameter that controls exponentiation of the weights across the plurality of subsets.

A weighting function may assign higher weights to gradients with held-out loss values closer to a held-out loss value of a current model, and lower weights to gradients with held-out loss values farther from the held-out loss value of the current model.

According to an exemplary embodiment, a method for training a DNN comprises combining a stochastic approach with second order HF ST. The combination uses average gradient information from previous iterations.

According to an exemplary embodiment, a method uses at least one stochastic approach to decrease a computational load required for training a DNN, and includes providing a subset of training data, applying HF ST to the subset of training data, and iteratively providing successive subsets of the training data and applying HF ST to each successive subset until DNN parameters converge to a stable solution.

According to an exemplary embodiment, iteratively providing successive subsets of the training data comprises reusing information from a previous iteration. In accordance with an embodiment, gradient information of past iterations is weighted and integrated to current gradient information obtained for current parameter values of the DNN. A subset of training data can be dynamically resized for each iteration and generated from any sampling strategy of original training data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
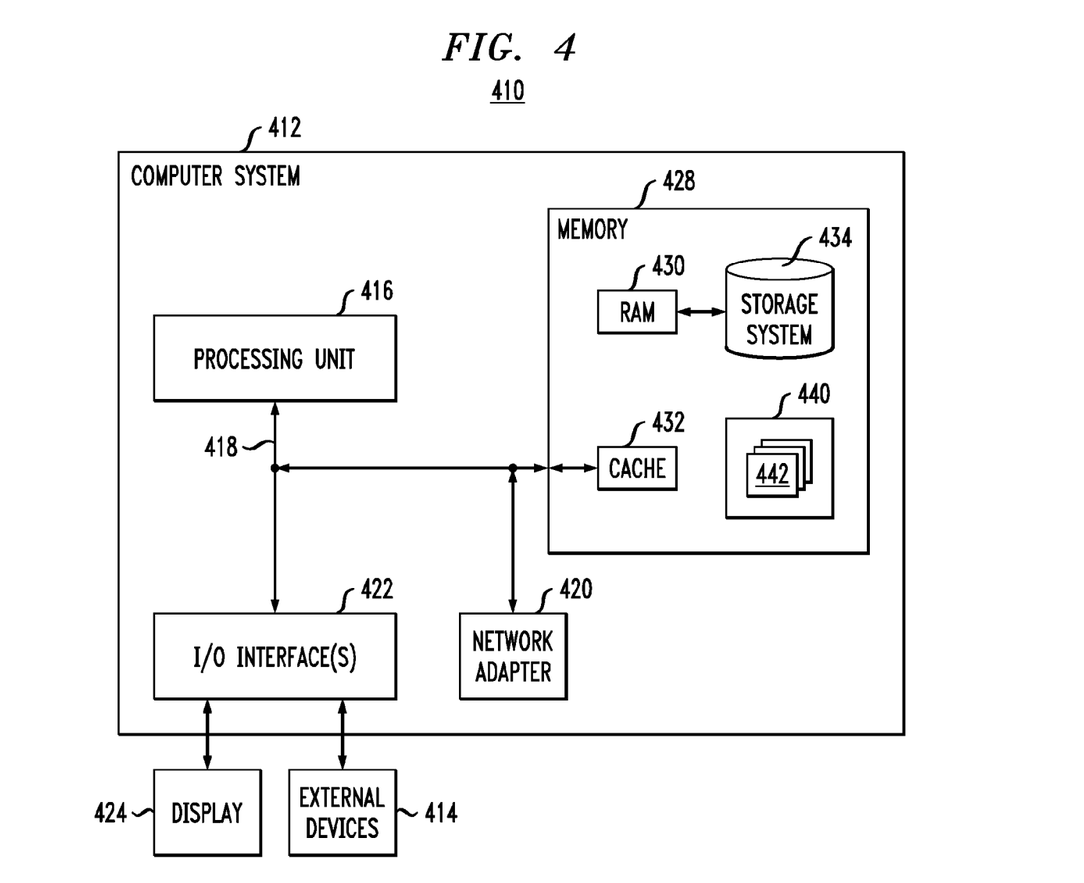
FIG. 4 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 4, in a computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 412 typically includes a variety of computer system readable media. Such media may be any available media that is accessible by computer system/server 412, and it includes both volatile and non-volatile media, removable and non-removable media.

The system memory 428 can include computer system readable media in the form of volatile memory, such as random access memory (RAM) 430 and/or cache memory 432. The computer system/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As depicted and described herein, the memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc., one or more devices that enable a user to interact with computer system/server 412, and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for training a deep neural network, comprising:
receiving, using at least one processor operatively coupled to a memory of a computer system, speech data for the training;
formatting, using the at least one processor, the speech data for the training;
dividing, using the at least one processor, the speech data into a plurality of subsets;
performing, using the at least one processor, Hessian-free sequence training on a first subset of the plurality of subsets of the speech data;
iteratively performing, using the at least one processor, the Hessian-free sequence training on successive subsets of the plurality of subsets of the speech data;
wherein iteratively performing the Hessian-free sequence training comprises:
processing the first subset of the speech data to generate a first gradient of loss in a first iteration;
processing a successive subset of the speech data to generate a second gradient of loss in a second iteration;
dynamically computing weights for the first gradient of loss and for the second gradient of loss; and
reusing gradient information from at least one previous iteration, wherein reusing the gradient information from the at least one previous iteration comprises integrating a weighted first gradient of loss and a weighted second gradient of loss to generate a solution to the second iteration; and
transmitting, using the at least one processor, a result of the iterative performance of the Hessian-free sequence training to the deep neural network.

2. The method of claim 1, wherein the gradient information comprises average gradient information.

3. The method of claim 1, wherein the weights for first gradient of loss and the second gradient of loss are chosen based on a difference between a held-out loss of the second iteration and a held-out loss of the first iteration.

4. The method of claim 1, wherein the dynamic computing comprises changing weights assigned to the first gradient of loss and the second gradient of loss for different iterations.

5. The method of claim 1, wherein the dynamic computing comprises dynamically estimating weights assigned to the first gradient of loss and the second gradient of loss to provide a loss function gradient before an iteration takes place.

6. The method of claim 1, wherein weights assigned to the first gradient of loss and the second gradient of loss are based on a tunable parameter that controls exponentiation of the weights across the plurality of subsets.

7. The method of claim 1, wherein the dynamic computing comprises using a weighting function to assign higher weights to gradients with held-out loss values closer to a held-out loss value of a current model, and lower weights to gradients with held-out loss values farther from the held-out loss value of the current model.

* * * * *